H. T. INGHRAM.
APPARATUS FOR MAKING CUP PASTRY.
APPLICATION FILED JUNE 4, 1919.
1,420,378.
Patented June 20, 1922.
2 SHEETS—SHEET 2.
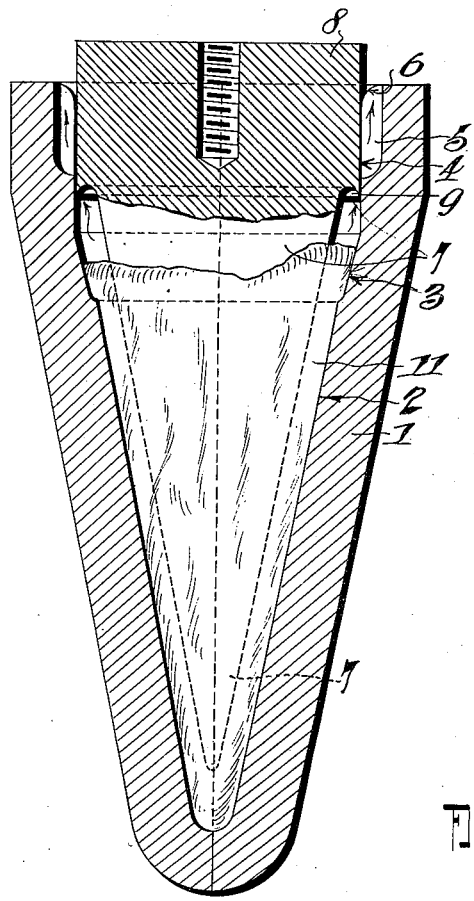
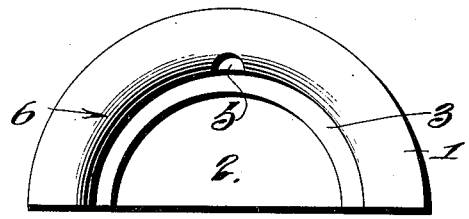
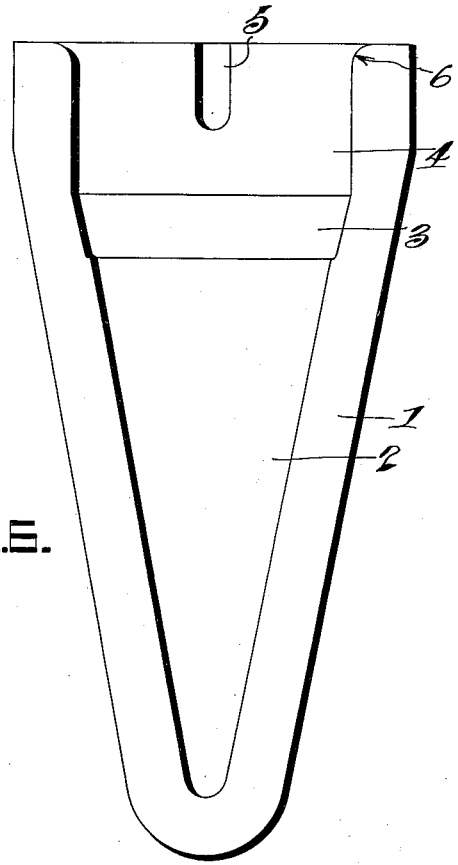
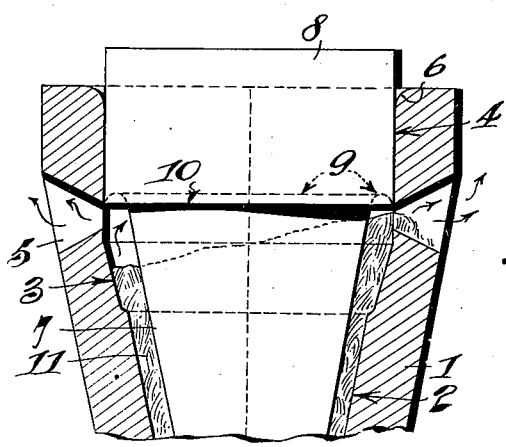
INVENTOR
Howard T. Inghram
BY
Fred G. Dieterich & Co.
ATTORNEYS

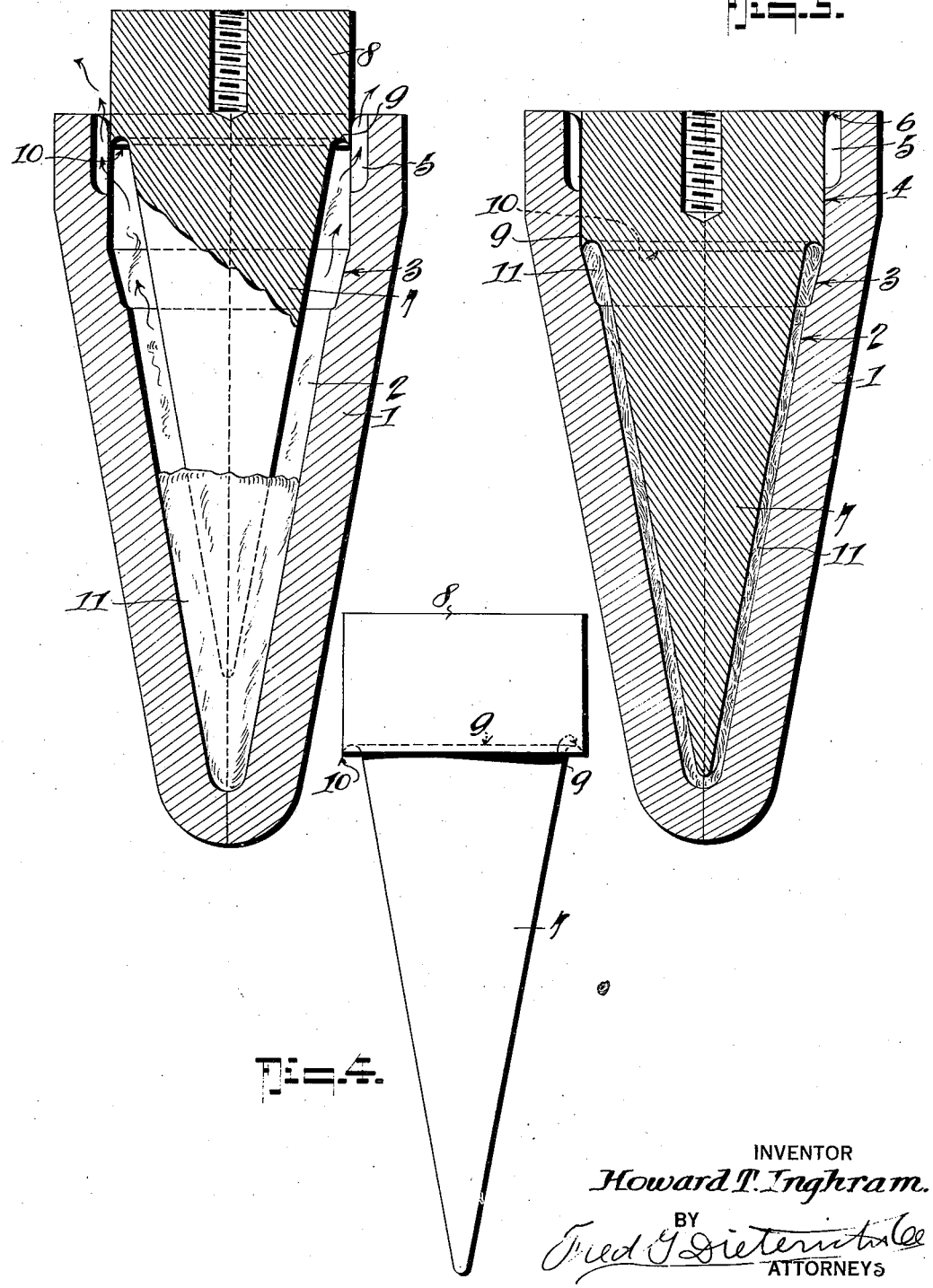

UNITED STATES PATENT OFFICE.

HOWARD T. INGHRAM, OF CHICAGO, ILLINOIS.

APPARATUS FOR MAKING CUP PASTRY.

1,420,378.  Specification of Letters Patent.  Patented June 20, 1922.

Application filed June 4, 1919. Serial No. 301,608.

*To all whom it may concern:*

Be it known that I, HOWARD T. INGHRAM, a citizen of the United States, residing at Chicago, in the county of Cook and State of Illinois, have invented a new and Improved Apparatus for Making Cup Pastry, of which the following is a specification.

The present invention has for one of its objects to provide a mold and a core structure for cup pastry making apparatus of the type especially designed for the manufacture of ice cream cones or other similar cup pastry, the same being so designed and constructed and embodying such cooperation of parts, that the waste of batter is reduced to the minimum or is entirely eliminated so that perfect cones may be made without the necessity of trimming off excess or surplus batter, as has heretofore been the practice.

Another object of the invention is to provide an apparatus for use in cup pastry manufacture by the employment of which a larger number of perfect cones per unit quantity of flour, than has heretofore been possible, may be obtained, and thus the manufacturing cost of production may be lowered without the necessity of reducing the size, weight or quality of the pastry articles themselves.

It is an object of the invention to provide a means whereby the baking mixtures, whether dispensed in exact or varying quantities, may be worked down and ultimately confined or compressed within that compartment which is of uniform capacity or volume, thereby ensuring a product of exact size having a smooth top and edge of any desired shape or angle and eliminating waste and the necessity of trimming the baked article.

A further object of the invention is to provide an apparatus of such construction which will make the walls of the product from top to bottom of uniform thickness, making possible the employment of a baking compartment of any desired volume or capacity and ensuring the centering of the core element in the female mold element.

Another object of the invention is to provide for the manufacture of better cones than has heretofore been possible and to that end provide for the elimination of blow-holes and porous portions.

In its generic nature, the apparatus constituting the present invention, embodies a female mold and a core with provisions whereby the mold will be plugged at its mouth before the core has become fully seated to restrain the escape of batter, provision being made for the escape of steam. In its more subordinate nature the invention includes a female mold and a core with provisions whereby the mold will be plugged, as aforesaid, provision being made for the free escape of steam during the initial expansion stages of the batter and for the slow or restricted escape of steam just prior to the time the core reaches home (arrives at its final seated position).

In its more specific nature, the invention provides a female mold, the mouth of the mold cavity being formed to receive a head, plunger or plug member of the core whereby the core will be guided and held with its axis at all times coincident with the axis of the mold cavity; the core head is designed to close the mouth of the mold cavity against the escape or overflow of batter, provision being made in the female mold for the free escape of steam and vapors upon insertion of the core and head into the mold and provision is also made whereby the escape of steam or vapors may be reduced as the molding part of the mold cavity becomes filled with batter and the core becomes seated to its final position, whereby when the core is finally seated the mold will become substantially entirely closed.

In its more subordinate nature, the invention includes those novel details of construction, combination and arrangement of parts, all of which is fully described and then specifically pointed out in the appended claims and illustrated in the accompanying drawings, in which:—

Figure 1 is a vertical section, parts being broken away, illustrating the apparatus with the batter introduced into the mold and the core in the first position, i. e., partly introduced into the mold cavity.

Figure 2 is a view similar to Figure 1 illustrating a later position in which the core has been forced into the mold cavity a sufficient distance to cut off the free escape ports for the steam and vapor products and thus allow the generation of pressure within the mold cavity.

Figure 3 is a vertical cross section illustrating the final position the parts assume while the content of the mold is being baked.

Figure 4 is a side elevation of the core.

Figure 5 is a top plan view of one of the half-mold sections.

Figure 6 is a face elevation of the same.

Figure 7 is a detail section and part elevation of a modification hereinafter specifically referred to.

In the drawings, in which like numerals of reference indicate like parts in all of the figures, 1 represents the female molds. For purpose of illustration, a single unit mold has been shown, although it is obvious that a mold made of a number of cavities and a number of cores cooperating therewith may be employed, as in the well-known Bruckman automatic machines, and it is to be understood that the invention is not limited to a mold structure having any particular number of die or mold pocket sections and cores. The female mold 1 may be either of the solid bed type or of the split or sectional mold bed type. The female mold is provided with a molding cavity 2 which forms the external surface of the cone or other cup pastry product being manufactured. The mold cavity 2 may be provided with an enlargement 3 to form a collar on the cone, if desired, although it should be observed that the particular configuration of the die or molding portion of the mold cavity may be of any desired form or shape. Contrary to the former practice, the female mold is provided above the molding portion with a cylindrical portion 4 and steam escape ports 5, the mouth edge of the mold cavity being rounded, as at 6, or otherwise formed, in such manner that the core head will not hang in entering the mold. 7 designates the core proper which cooperates with the molding or die face of the female mold to form the article 11, the core including a head 8 which fits the cylindrical portion 4 and has a shoulder 9 that forms the top or mouth edge of the article, the shoulder 9 being preferably concaved as indicated, thus providing a knife edge 10, serving, as one purpose, to sever any batter that may rise into the cylindrical portion of the mold.

11 designates the batter or article being manufactured.

In the practical use of the invention the core is removed from the female mold cavity and a charge of batter 11 is introduced into the mold either by pouring the same into the mold cavity or dipping the core into the batter and then placing the core in the mold in accordance with the well-known practice. In placing the core into the mold it is introduced as shown in Figure 1, the core being projected into the mold so that the core head 8 will act as a plug to close the entrance to the mold cavity against the escape of batter. The steam and vapors escape as indicated by the arrows in Figure 1. The core is then further projected into the mold cavity until the position shown in Figure 2 is reached, thus cutting off for the moment the principal escape of vapors and steam and permitting a pressure to be generated within the cavity. The core is then raised again to open the escape ports 5 and is again projected to close the same, the operation of projecting and retracting the core being conducted such number of times as may be found desirable in practice until the escape of steam has practically subsided, at which time the batter will have filled the molding part of the cavity and become practically evenly distributed at the mouth of the same. It is to be understood that the alternate movements of the core are such that the core gradually approaches its seated position (see Figure 3) so that by the time the escape of steam has practically subsided the core will have assumed the position shown in Figure 3, the slight amount of steam that may be generated after the core head 8 has closed the escape ports 5 is free to work its way out between the opposing surfaces of the cylindrical portion 4 and head 8. Thus, it will be seen that as the core reaches its final position, the batter will have been fully distributed over the molding surfaces of the female mold and core and will have been compressed. As the compression takes place after approximately all of the steam has escaped the mass will be compacted and blowholes eliminated.

While the above described manner of manipulating the core and mold is an advantageous one, I desire it understood that in the use of the apparatus other manipulations of the parts can be effected to obtain the final desired results as, for instance, the core may be first forced to its final seating position, then raised, and then reciprocated until finally seated. When the core is forced home immediately it is inserted into the female mold cavity, the batter being semi-liquid is distributed immediately to the desired extent and then, by reciprocating the core, the distributed batter is worked in a manner which makes it light and thoroughly baked, it being possible to bake cones with this method without providing the special vent holes 5 but this would require a much longer time. Again, the method of manipulating the core for the purpose of spreading the batter and molding the same may be applied in various ways which differ from the pure reciprocating movement namely,—the cores may be forced to their final seating position by uniform gradual pressure;—they may be forced to their seat by a persistent yielding pressure:—the core bar and core may be made heavy enough to let the force of gravity do the work of finally seating the core. If the yielding pressure or the heavy core and bar be used, the cores will lower into the batter until the force of the generated steam becomes great enough to overcome the weight of the yielding pressure, then the core will raise until the steam escapes, drop down again until the steam pressure again overcomes it, raise again, and so on.

In carrying out the invention it is, of course, preferable to introduce into the mold cavity as nearly as possible the exact amount of batter to be employed although with my invention excess of batter is not fatal to the operation for excess batter can escape through the ports 5 and if the excess is very great the only effect will be to increase the size of the cone somewhat by reason of the core not going fully home to its seat after passing down beyond the ports 5. By locating the entrance of the ports 5 relatively close to the bottom of the cavity portion 4 (see Figure 7) the increase in size of the cone can be practically avoided.

It will also be observed that as the core head passes the entrance to the escape ports 5 any batter that may have passed through the escape ports 5 (see Figure 7) will be sheared or cut off by the knife edge 10, and thus freed from the molded product; on the next operation when a charge of batter is introduced into the mold cavity the steam pressure will blow out any of the material of the previous charge that may have passed into the escape ports 5 during the previous operation, thus clearing the ports 5 automatically. This clearing feature is aided by making the ports 5 as shown in Figure 7, so that the plug of batter in the port 5 from the previous charge can be blown out toward the larger end of the opening.

The escape of steam through the ports 5 is relatively free and unrestricted, while the escape of steam, when the core is in the position indicated in Figure 2, is a restricted one. The head plug has provision for forcing all batter which overflows the molding cavity back into the mold cavity upon the full insertion of the core.

It will be observed also that by constructing the mold as shown and described a large bearing surface between the head 8 and the female mold is provided, thus holding the core proper always centered in the female mold cavity, or in other words, maintaining the axis of the core coincident with the axis of the cavity, thus ensuring that the wall of the article will be of the same thickness throughout.

The drawings illustrate the preferred embodiment of the invention but I do not wish it understood that I limit myself to any specific details of construction beyond such as may be made necessary by the condition of the prior art or as specifically mentioned in the claims.

From the foregoing description taken in connection with the accompanying drawings, it is thought the complete construction, operation and advantages of my invention will be readily understood.

What I claim is:—

1. In apparatus of the class stated, a female mold having a molding cavity and a throat between the molding cavity and the mouth of the mold, a core adapted to enter and partially fill said molding cavity and means cooperative with the throat for restricting the escape of batter during the initial part of the introduction of the core into the mold while permitting the escape of steam, and positively closing off escape of batter during the final portion of the insertion of the core into the mold substantially as shown and described.

2. In apparatus of the character stated, a female mold having a molding cavity closed except at the mouth of the mold and having a throat between the molding cavity and the mouth of the mold, the diameter of the throat not exceeding the diameter of the adjacent end of the molding cavity, a core adapted to enter and partly fill the molding cavity and including a plug to fit into said throat to close the mold against the escape of batter, and means permitting the free escape of steam upon the partial introduction of the core plug into the throat while restraining the overflow of batter.

3. In apparatus of the character stated, a female mold having a molding cavity and having a throat between the molding cavity and the mouth of the mold, the diameter of the throat not exceeding the diameter of the adjacent end of the molding cavity, a core adapted to enter and partly fill the molding cavity and including a plug to fit into said throat to close the mold against the escape of batter, and means permitting the free escape of steam during the initial part only of the introduction of the core plug into the throat.

4. In apparatus of the character described, a female mold having a cavity provided with a throat at its mouth and a molding or die section beyond the throat, a core element including a core proper and a head portion adapted to enter the throat and close the mouth of the mold to restrict the escape of batter, means for relieving pressure within the mold cavity during the commencement of the insertion of the core proper and head and maintaining pressure within the mold cavity until the final position of the core is reached.

5. In apparatus of the character stated, a female mold having a cavity provided with a die or molding portion and a counterbore adjacent to the mouth of the cavity provided with steam escape ports, a core adapted to enter and partly fill said mold cavity and cooperate with the die portion thereof to give form to the article, means cooperative with the core for closing said steam escape ports, said escape ports lying with their entrance adjacent to the die portion of the mold cavity whereby the said ports will be closed approximately at the time the core becomes fully seated in the mold cavity.

6. In apparatus of the character described, a female mold having a molding cavity and a throat between the molding cavity and the mouth of the mold, a core adapted to enter and partly fill the molding cavity, a head movable with the core to enter and fill the throat whereby to close the mold against escape of batter after the core and head are inserted a predetermined distance, steam relief ports in the mold communicating with the throat above the molding cavity adapted to permit the free escape of steam upon the partial insertion of the core, all being arranged whereby as the core approaches its fully seated position said steam escape ports will be closed off and the batter confined under pressure within the mold.

7. In apparatus of the character described a female mold having a molding recess and a throat between the molding recess and the mouth of the mold, said throat where it meets the adjacent end of the molding recess being of the same diameter as the adjacent end of the molding recess, a core adapted to enter and partially fill the molding recess, a head plug carried by the core adapted to enter and fill the throat, said head plug having a concaved surface adjoining the core proper to present an annular knife edge substantially as shown and described.

HOWARD T. INGHRAM.